United States Patent
Roberge

(10) Patent No.: US 10,337,349 B2
(45) Date of Patent: Jul. 2, 2019

(54) ANTI-WINDMILLING SYSTEM FOR A GAS TURBINE ENGINE

(71) Applicant: UNITED TECHNOLOGIES CORPORATION, Farmington, CT (US)

(72) Inventor: Gary D. Roberge, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 270 days.

(21) Appl. No.: 15/139,403

(22) Filed: Apr. 27, 2016

(65) Prior Publication Data

US 2017/0314411 A1 Nov. 2, 2017

(51) Int. Cl.
| | | |
|---|---|---|
| *F01D 15/12* | (2006.01) |
| *F01D 21/00* | (2006.01) |
| *F04D 29/053* | (2006.01) |
| *F04D 29/32* | (2006.01) |
| *F02K 3/06* | (2006.01) |
| *F02C 7/32* | (2006.01) |

(Continued)

(52) U.S. Cl.
CPC ........... *F01D 21/006* (2013.01); *F01D 15/12* (2013.01); *F02C 7/32* (2013.01); *F02C 7/36* (2013.01); *F02K 3/06* (2013.01); *F04D 29/053* (2013.01); *F04D 29/325* (2013.01); *F16D 63/002* (2013.01); *F16D 63/006* (2013.01); *F01D 21/04* (2013.01); *F05D 2220/32* (2013.01); *F05D 2220/323* (2013.01); *F05D 2260/40311* (2013.01); *F05D 2260/902* (2013.01); *F05D 2260/903* (2013.01); *F05D 2270/62* (2013.01); *F16D 11/16* (2013.01); *F16D 2011/006* (2013.01)

(58) Field of Classification Search
CPC ........ F01D 15/12; F01D 21/006; F01D 21/04; F16D 2011/006; F16D 11/16
USPC ..................................... 188/68, 69, 166, 265
See application file for complete search history.

(56) References Cited

U.S. PATENT DOCUMENTS 3,703,941 A * 11/1972 Ohie ....................... B60T 1/005
188/31
4,669,959 A 6/1987 Kalogeros
(Continued)

FOREIGN PATENT DOCUMENTS

| EP | 1918564 A2 | 5/2008 |
| EP | 3163049 A2 | 5/2017 |

OTHER PUBLICATIONS

European Search Report for European Application No. 17168431.9 dated Oct. 16, 2017.

(Continued)

*Primary Examiner* — Justin D Seabe
*Assistant Examiner* — Behnoush Haghighian
(74) *Attorney, Agent, or Firm* — Carlson, Gaskey & Olds, P.C.

(57) ABSTRACT

A gas turbine engine has an engine static structure. At least one component rotatable relative to the engine static structure about an engine axis of rotation. A fan is coupled to at least one component for rotation about the engine axis of rotation. An actuator is mounted to the engine static structure, wherein the actuator is activated to prevent the fan from rotation and is inactivated to allow the fan to rotate. A method for preventing rotation of a fan in a gas turbine engine is also disclosed.

4 Claims, 3 Drawing Sheets

(51) Int. Cl.
*F02C 7/36* (2006.01)
*F16D 63/00* (2006.01)
*F01D 21/04* (2006.01)
*F16D 11/16* (2006.01)
*F16D 11/00* (2006.01)

(56) References Cited

U.S. PATENT DOCUMENTS

| | | | |
|---|---|---|---|
| 6,312,215 B1* | 11/2001 | Walker | F01D 21/006 188/74 |
| 7,073,641 B2* | 7/2006 | Carriot | B66D 5/14 188/161 |
| 7,225,607 B2* | 6/2007 | Trumper | F01D 21/006 60/223 |
| 7,621,117 B2 | 11/2009 | Dooley et al. | |
| 7,849,668 B2* | 12/2010 | Sheridan | F01D 15/10 184/6.11 |
| 7,861,533 B2 | 1/2011 | Dooley | |
| 8,966,876 B2 | 3/2015 | Suciu et al. | |
| 8,978,352 B2 | 3/2015 | Suciu et al. | |
| 9,745,897 B2* | 8/2017 | Francisco | F01D 17/06 |
| 2007/0265761 A1 | 11/2007 | Dooley et al. | |
| 2007/0289310 A1* | 12/2007 | Dooley | F01D 15/10 60/773 |
| 2008/0092548 A1* | 4/2008 | Morford | F02K 1/06 60/771 |
| 2010/0086403 A1 | 4/2010 | McCune | |
| 2010/0133813 A1 | 6/2010 | Cote et al. | |
| 2010/0236216 A1* | 9/2010 | Winter | F01D 21/00 60/204 |
| 2012/0180498 A1* | 7/2012 | Francisco | F01D 17/06 60/783 |
| 2015/0345571 A1* | 12/2015 | Yi | F16D 65/28 188/164 |
| 2015/0377041 A1 | 12/2015 | Partyka et al. | |

OTHER PUBLICATIONS

USPA U.S. Appl. No. 15/089,835, filed Apr. 4, 2016.
USPA U.S. Appl. No. 15/089,891, filed Apr. 4, 2016.

* cited by examiner

ANTI-WINDMILLING SYSTEM FOR A GAS TURBINE ENGINE

TECHNICAL FIELD

The present disclosure relates generally to anti-windmilling systems for a gas powered turbine.

BACKGROUND

Geared turbofan engines utilize a gas powered turbine engine to drive rotation of a fan through a gearing system. The fan drives air along a bypass flow path in a bypass duct defined within a nacelle, while a compressor section drives air along a core flow path for compression and communication into a combustor section with subsequent expansion through a turbine section. The compression section draws in and compresses air, the combustor section mixes compressed air with a fuel and ignites the mixture, and the combustion products are expanded across the turbine section. This expansion across the turbine section drives the turbine to rotate and communicate this rotation to the compressor section via at least one shaft. The rotation of the shaft is translated through the gearing system to the fan, which is positioned forward of the compressor section.

When an aircraft with a geared turbofan engine is in a non-operational mode, such as when the aircraft is parked at an airfield, some of the gas turbine engine components are subject to rotation. For example, crosswinds entering the geared turbofan can drive rotation of the fan in either a clockwise or counterclockwise direction, dependent on the direction of the wind. This rotation is referred to as windmilling. Rotation of the fan, in turn, is translated to the shaft through the gearing system. In some geared turbofans, one or more components within the engine require active lubrication while the engine is rotating in order to prevent damage or deterioration to the engine systems.

SUMMARY OF THE INVENTION

In a featured embodiment, a gas turbine engine has an engine static structure. At least one component rotatable relative to the engine static structure about an engine axis of rotation. A fan is coupled to at least one component for rotation about the engine axis of rotation. An actuator is mounted to the engine static structure, wherein the actuator is activated to prevent the fan from rotation and is inactivated to allow the fan to rotate.

In another embodiment according to the previous embodiment, the actuator comprises a solenoid.

In another embodiment according to any of the previous embodiments, at least one component comprises at least one shaft that is driven by a turbine section, and including a gear system that is driven by the turbine section and drives the fan, and wherein the actuator is activated to prevent rotation of the fan by preventing rotation of the at least one shaft.

In another embodiment according to any of the previous embodiments, the actuator includes a first feature and the at least one shaft includes a second feature that locks with the first feature when the actuator is activated.

In another embodiment according to any of the previous embodiments, the second feature comprises a magnetic material that is attached to the at least one shaft and the first feature interacts with the magnetic material to prevent rotation of the at least one shaft when activated.

In another embodiment according to any of the previous embodiments, the first and second features interact using friction to prevent the at least one shaft from rotating.

In another embodiment according to any of the previous embodiments, one of the first and second features comprises a dog extension and wherein the other of the first and second features comprises a recess that receives the dog extension to prevent rotation of the at least one shaft.

In another embodiment according to any of the previous embodiments, a control activates the actuator under a first predetermined condition and inactivates the actuator under a second predetermined condition.

In another embodiment according to any of the previous embodiments, the first predetermined condition comprises a non-operational engine condition and the second predetermined condition comprises an operational engine condition.

In another embodiment according to any of the previous embodiments, the non-operational condition comprises a windmilling condition while the gas powered turbine engine is powered off, and wherein the operational engine condition occurs when the gas powered turbine engine is powered on.

In another embodiment according to any of the previous embodiments, at least one sensor is used to identify the non-operational engine condition.

In another featured embodiment, a gas turbine engine has an engine static structure. At least one shaft is rotatable relative to the engine static structure about an engine axis of rotation. A turbine section is configured to drive at least one shaft. A fan is coupled to at least one shaft via a geared architecture. An actuator is mounted to the engine static structure, wherein the actuator is activated to prevent the fan from rotation during an engine non-operational condition and is inactivated to allow the fan to rotate during an engine operational condition.

In another embodiment according to the previous embodiment, the actuator comprises a solenoid.

In another embodiment according to any of the previous embodiments, the actuator includes a first feature and the at least one shaft includes a second feature that locks with the first feature when the actuator is activated.

In another embodiment according to any of the previous embodiments, a control activates the actuator under the non-operational condition and inactivates the actuator under the operational condition.

In another embodiment according to any of the previous embodiments, the engine non-operational condition comprises a windmilling condition.

In another embodiment according to any of the previous embodiments, the actuator is positioned aft of the turbine section.

In another featured embodiment, a method for preventing rotation of a fan in a gas turbine engine includes driving a fan with a geared architecture that is driven by at least one shaft, and activating an actuator to prevent rotation of the fan during a non-operational engine condition.

In another embodiment according to the previous embodiment, the non-operational engine condition comprises a windmilling condition, and including activating the actuator to frictionally restrain the at least one shaft from rotating to prevent the fan from windmilling.

In another embodiment according to any of the previous embodiments, the non-operational engine condition comprises a windmilling condition, and wherein the actuator includes a first feature and the at least one shaft includes a second feature that locks with the first feature when the actuator is activated, and including activating the actuator lock the first and second features together to prevent the fan from windmilling.

These and other features of the present invention can be best understood from the following specification and drawings, the following of which is a brief description.

DETAILED DESCRIPTION

Figure 1:
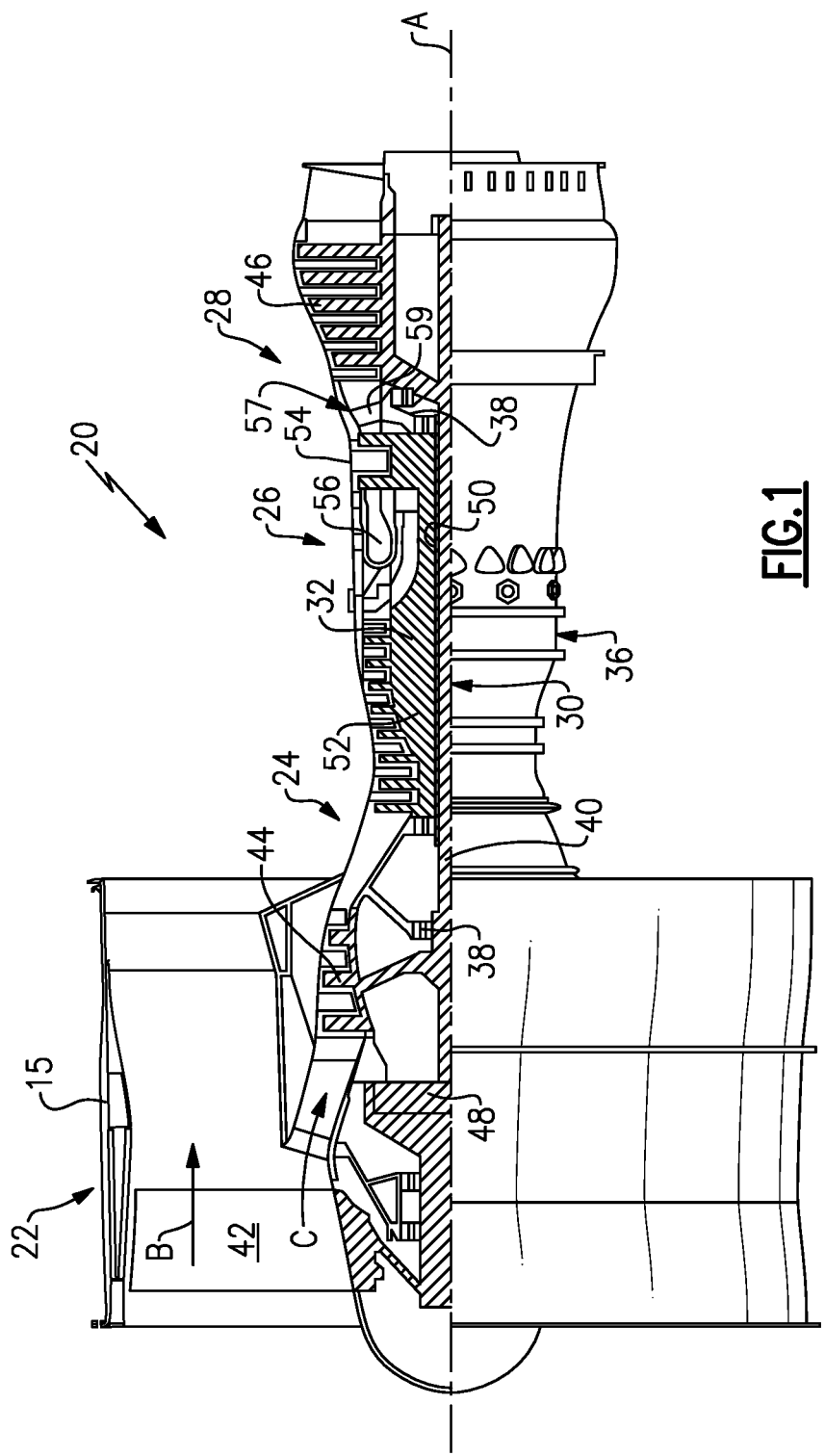
FIG. 1 schematically illustrates an exemplary gas powered turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/s).

Some example geared turbofan engines are subject to rotation of the fan, and connected components, due to wind, other atmospheric conditions, or induced movement of air including exhaust form adjacent operational aircraft while the engine is on the ground at rest and inoperative. This rotation is otherwise referred to as windmilling, and can cause rotation in either a clockwise or counter-clockwise direction depending on the direction of the prevailing wind relative to the engine. Further, some example geared turbofan engines include components, such as journal bearings in a fan drive gear system, that are highly sensitive to wear in the absence of active provision of lubrication. Rotation of the low pressure turbine, fan and corresponding fan drive gear system in the absence of active lubrication can result in premature degradation and adverse durability effects. Approaches for anti-windmilling or locking a fan rotor and corresponding fan drive gear system eliminates the possibility of degradation due to prevailing wind while the engine is inoperative. Another example of an anti-windmilling such approach is described below.

Figure 2:
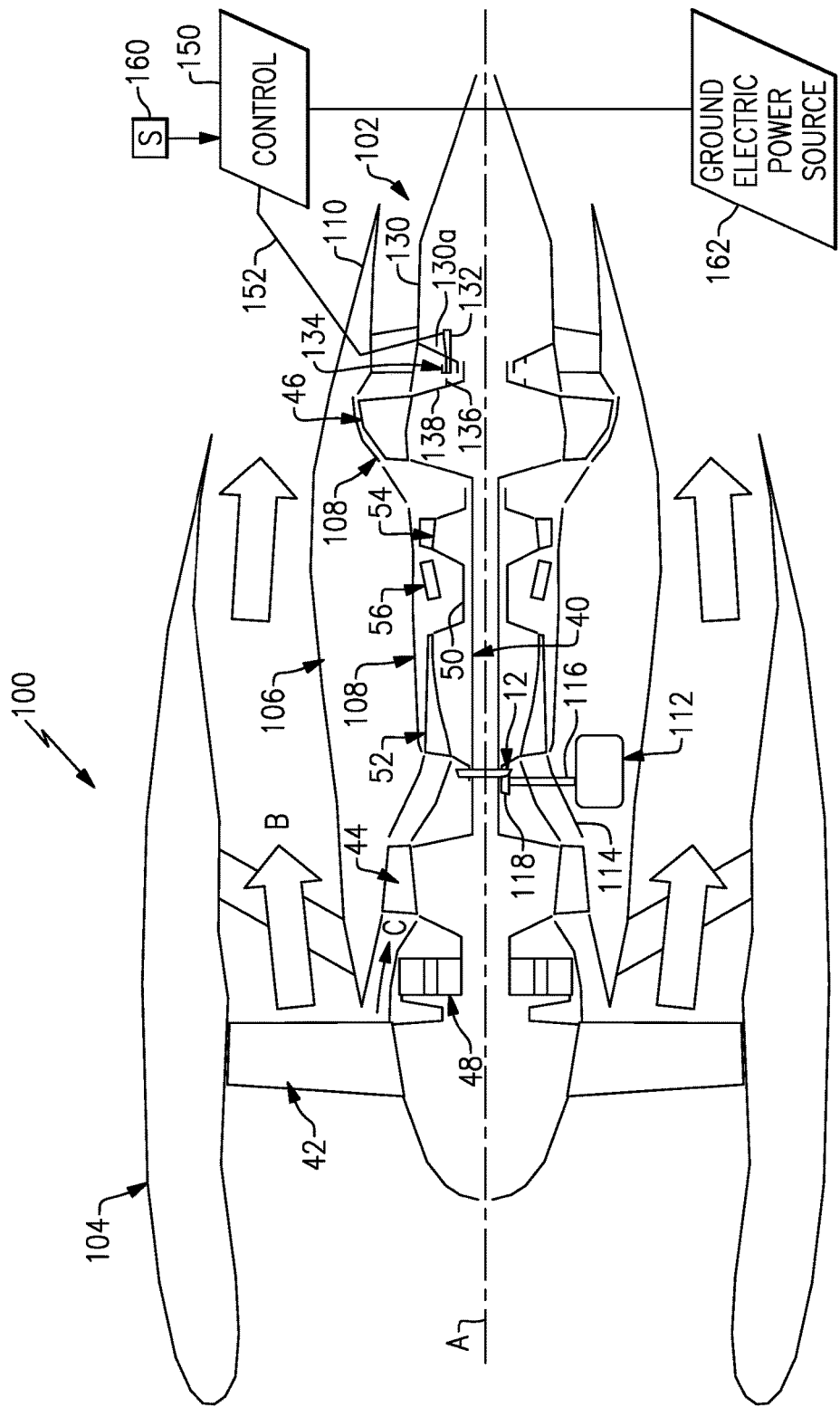
FIG. 2 schematically illustrates an exemplary gas powered turbine engine including a geared anti-windmilling system.

With continued reference to FIG. 1, FIG. 2 schematically illustrates a gas turbine engine 100 including an anti-windmilling system 102. The anti-windmilling system 102 is utilized to prevent the fan 42 from windmilling when the engine 100 is on the ground and in a non-operational condition. During standard engine operational conditions, the fan 42 drives air along the bypass flow path B in a bypass duct defined within a nacelle 104, while the compressor section 24 drives air along the core flow path C defined within a core cowl 106.

The low 44 and high 52 pressure compressors draw in and compress air, the combustor 56 mixes compressed air with a fuel and ignites the mixture, and the combustion products are expanded across the low 46 and high 54 pressure turbines which are supported within outer case structures 108. The low pressure turbine 46 drives the low pressure compressor 44 and fan 42 via the first or low speed shaft 40, while the high pressure turbine 54 drive the high pressure compressor 52 via the second or high speed shaft 50. The rotation of the low speed shaft 40 is translated through the geared architecture 48 to the fan 42. Core flow C exits the engine via a turbine exhaust case 110.

The gas turbine engine 100 includes a high rotor accessory drive gearbox 112 that is supported within an intermediate case section 114. The intermediate case section 114 is positioned between the low pressure compressor 44 and the high pressure compressor 52. The intermediate case section 114 includes one or more struts configured to allow the passage of a towershaft 116 through the primary flowpath to connect to a bevel gear set 118 of a high rotor power takeoff 120. The bevel gear set 118 is driven by the low speed shaft 40.

In the example of FIG. 2, the anti-windmilling system 102 is supported by an engine static structure 130 and includes an actuator 132 that is mounted to the engine static structure 130. The actuator 132 is activated to prevent the fan 42 from rotating during while the engine 100 is inactive and the actuator 132 is inactivated to allow the fan 42 to freely rotate when the engine is in an active operational mode. In one example, the actuator 132 comprises a solenoid; however, other types of actuators could also be used and can be powered electronically, magnetically, or pneumatically, for example.

In one example, the engine static structure 130 comprises an inner case structure 130a that is within the turbine exhaust case 110 at a location that is aft of the low pressure turbine 46. The actuator 132 is fixed to this inner case structure 130a such that the actuator 132 is in a position to engage or interact with a rotating component that is associated with the low speed shaft 40. The actuator 132 can then be activated to prevent rotation of the fan 42 by preventing rotation of the shaft 40.

In one example, the actuator 132 includes a first feature 134 and the shaft includes a second feature 136 that locks with the first feature 134 when the actuator 132 is activated. In one example, the first feature 134 extends outwardly from the inner case structure 130a to engage a rotor 138 associated with the low pressure turbine 46. Restraining the rotor 138 will in turn prevent the shaft 40 and fan 42 from rotating.

The first 134 and second 136 features interact using friction, or other types of rotational interference to prevent the shaft 40 from rotating. The force of interaction between the first 134 and second 136 features should be strong enough to cease rotation of the shaft 40 and associated fan 42 when the fan 42 is no longer being driven and is rotating below a shutoff threshold, as well as being strong enough to prevent rotation of the shaft 40 and fan 42 while the engine 100 is inoperative.

Figure 3:
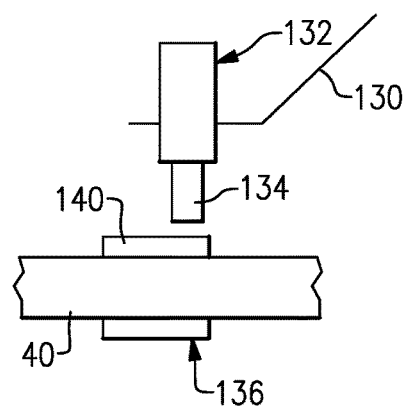
FIG. 3 is a schematic view of one example actuator configuration.

In one example, the first 134 and second 136 features interact using a magnetic force to prevent the shaft 40 from rotating. For example, as shown in FIG. 3, the second feature 136 comprises a magnetic material 140 that is attached to the shaft 40 and the first feature 134 interacts with the magnetic material 140 via electromagnetic attraction to prevent rotation of the shaft 40 when activated.

Figure 4:
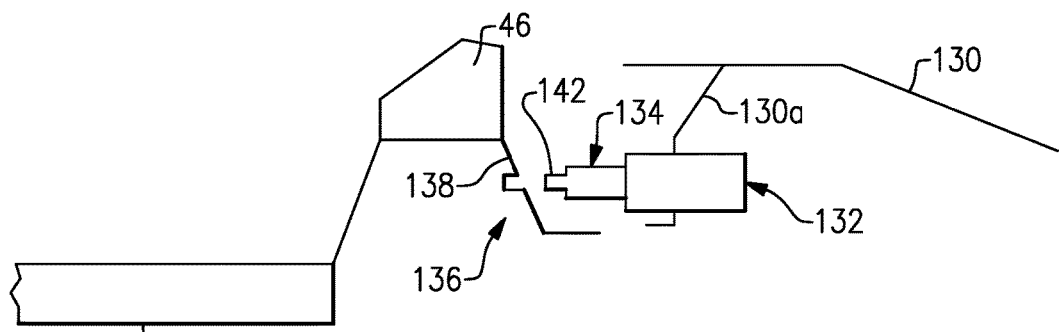
FIG. 4 is a schematic view of another example actuator configuration.

In another example shown in FIG. 4, one of the first 134 and second 136 features comprises a dog extension 142 and the other of the first 134 and second 136 features comprises a recess 144 that receives the dog extension 142 to prevent rotation of the shaft 40. In the example shown in FIG. 4, the recess 144 is formed within the rotor 138 of the low pressure turbine 46 and the dog extension 142 is formed as part of the actuator 132; however, a reverse configuration could also be utilized.

A control 150 activates the actuator 132 under a first predetermined condition and inactivates the actuator 132 under a second predetermined condition. In one example, the first predetermined condition comprises a non-operational engine condition such as when the aircraft is parked and the engine 100 is inactive, and the second predetermined condition comprises an operational engine condition such as when the engine 100 is active. The control 150 is connected to the actuator 132 via a control connection 152. The control 150 is, in some examples, a general aircraft controller configured to control multiple aircraft systems. In alternative examples, the control 150 is a dedicated anti-windmilling controller communicatively coupled with general engine controllers, and configured to lock the shaft 40 and associated fan 42 in order to prevent windmilling.

The anti-windmilling system 102 includes one or more sensors 160 that are used to identify the non-operational engine condition. Any of various sensors can be used to detect when the shaft 40 should be locked to prevent windmilling. For example, sensor inputs to the control 150 could comprise weight on wheels, shaft speed sensor, fan speed sensor, aircraft velocity, engine control signals including engine fuel flow, pressure, temperature, etc. Such sensors allow the control 150 to determine if the aircraft is on the ground (weight on wheels), if engine shut-down has been completed, and if the aircraft has stopped moving (vehicle velocity). These determinations allow the controller to prevent the anti-windmilling lock from being applied while the aircraft is moving in flight or on the ground. Based on these inputs, when the control 150 identifies the non-operational condition, the control 150 activates the actuator 132 to lock the shaft 40 or another rotating component associated with the shaft 40 to prevent the fan 42 from windmilling while the gas powered turbine engine 100 is powered off. When the control identifies that the engine is under an operational engine condition, e.g. the gas powered turbine engine 100 is powered on, the control 150 inactivates the actuator 132 such that the fan 42 can rotate as needed. Control logic and redundancy features are added to ensure unintended deployment of the anti-windmilling lock during engine operation.

The subject invention utilizes an auxiliary statically-mounted, powered actuator 132, such as a solenoid for example, that is activated to engage a "dog" or other similar feature 134 that interacts with a corresponding feature 136 on the low rotor. The actuator 132 is used to interact with the rotor in a way that restrains the low rotor while the aircraft is parked thereby preventing rotation of the rotor. As discussed above, one concept contemplates a component fabricated using a magnetic material 140 that is attached to the shaft 40 of the low rotor and which engages a matching feature 134 that resists rotation using friction and/or rotational interference. The actuator 132 and resulting force is to be sized based on the size and architecture of the engine to ensure adequate force to prevent rotation. The subject locking features are easily integrated with the engine and/or aircraft control 150 to prevent deployment when engine 100 is in operation and not on the ground using one or more sensor inputs such as weight on wheels, engine speed sensor, etc.

By locking the low rotor, possible fan drive gear system journal bearing degradation in the absence of engine provided lubrication is prevented. Power for the solenoid or actuator 132 may be provided using aircraft battery, axillary battery, ground power sources or some other known power source. 162 (FIG. 2). Further, while the actuator and locking features are shown aft of the low pressure turbine 42, location of the actuator 132 and anti-rotation features may take place anywhere on the rotor. For example, the actuator 132 could be located near the geared architecture 48, the accessory drive gearbox 112, or the bevel gear set 118. This concept provides a relatively simple approach for rendering the low rotor in an anti-rotated state to prevent journal bearing damage while aircraft is on the ground.

As such, components within the fan drive gear system, or any other system connected to the low speed shaft, that require active lubrication can be locked such that active lubrication is not needed. Further, while described above is a system for preventing windmilling the system could also be used to lock the fan and shaft during maintenance if needed. Further, one of skill in the art having the benefit of this disclosure could envision any number of additional uses of the above described anti-windmilling system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for preventing rotation of a fan in a gas turbine engine comprising:
   driving a fan with a geared architecture that is driven by at least one shaft from a turbine section;
   using one or more sensors to identify a non-operational engine condition comprising at least a windmilling condition;
   including a control which receives data from the one or more sensors to determine if the aircraft is on the ground and is experiencing the windmilling condition by
   determining weight on wheels,
   determining if engine shut-down has been completed, and/or
   determining aircraft velocity to identify if the gas turbine engine is stationary; and
   activating an actuator positioned aft of the turbine section to prevent rotation of the fan during the windmilling condition.

2. The method of claim 1, including activating the actuator to frictionally and/or magnetically restrain the at least one shaft from rotating to prevent the fan from windmilling.

3. The method of claim 1, wherein the actuator includes a first feature and the at least one shaft includes a second feature that locks with the first feature when the actuator is activated to prevent the at least one shaft from rotating, wherein one of the first and second features comprises a dog extension and wherein the other of the first and second features comprises a recess that receives the dog extension, and including selectively activating the actuator to lock the first and second features together to prevent the fan from windmilling.

4. The method of claim 1, including communicating data from the one or more sensors to a control and only activating the actuator when the control determines that the gas turbine engine is powered off and is stationary.

* * * * *